United States Patent [19]

Boetger

[11] Patent Number: 4,489,855
[45] Date of Patent: Dec. 25, 1984

[54] INSTANT TIRE INFLATOR
[75] Inventor: Ronald L. Boetger, Willoughby, Ohio
[73] Assignee: Code Manufacturing, Inc., Willoughby, Ohio
[21] Appl. No.: 412,148
[22] Filed: Aug. 27, 1982
[51] Int. Cl.³ .............................................. B60C 23/10
[52] U.S. Cl. ......................................... 222/5; 141/38; 152/415; 224/30 R; 279/1 Q
[58] Field of Search ..................... 222/3, 5; 141/38, 4, 141/19, 67; 441/92, 93, 94, 96; 279/1 Q, 1 W, 102; 224/275, 30 R, 35, 39, 41; 137/223, 231; 152/415, 416

[56] References Cited

U.S. PATENT DOCUMENTS

| | | | |
|---|---|---|---|
| 2,141,033 | 12/1938 | Crowley | 137/231 |
| 2,173,619 | 9/1939 | Ames | 222/3 X |
| 2,575,908 | 11/1951 | Clifford | 222/5 X |
| 3,597,780 | 8/1971 | Coyle | 222/5 X |
| 3,754,731 | 8/1973 | Mackal et al. | 251/145 |
| 3,809,288 | 5/1974 | Mackal | 222/5 |

FOREIGN PATENT DOCUMENTS

| | | | |
|---|---|---|---|
| 500730 | 10/1951 | Italy | 224/30 R |
| 288671 | 4/1928 | United Kingdom | 152/415 |
| 296298 | 3/1929 | United Kingdom | 152/415 |

OTHER PUBLICATIONS

"Airjet" instruction, Thompson Designs Inc., Palo Alto Bicycles 1981/82 Catalog, p. 22; Palo Alto Bicycles, 171 University Ave., Palo Alto, CA 94302.

Primary Examiner—Charles A. Marmor
Assistant Examiner—Kevin P. Shaver
Attorney, Agent, or Firm—Watts, Hoffmann, Fisher & Heinke Co.

[57] ABSTRACT

An inflator for pneumatic tires that uses compressed gas. The inflator has a housing 10, a cartridge 12 of compressed gas that communicates through a passage 20 of the housing, and a valve chuck 14 connected to the passage and constructed to fit over and seal about a tire valve stem. The passage has a tubular member 50 with a restrictive orifice 60 that produces a pressure drop to the flow of gas. The valve chuck has a rotatable nut 64 that compresses an annular gasket 22 to provide a seal with the valve stem. A clamp removably secures the inflator to the underside of a bicycle seat.

6 Claims, 7 Drawing Figures

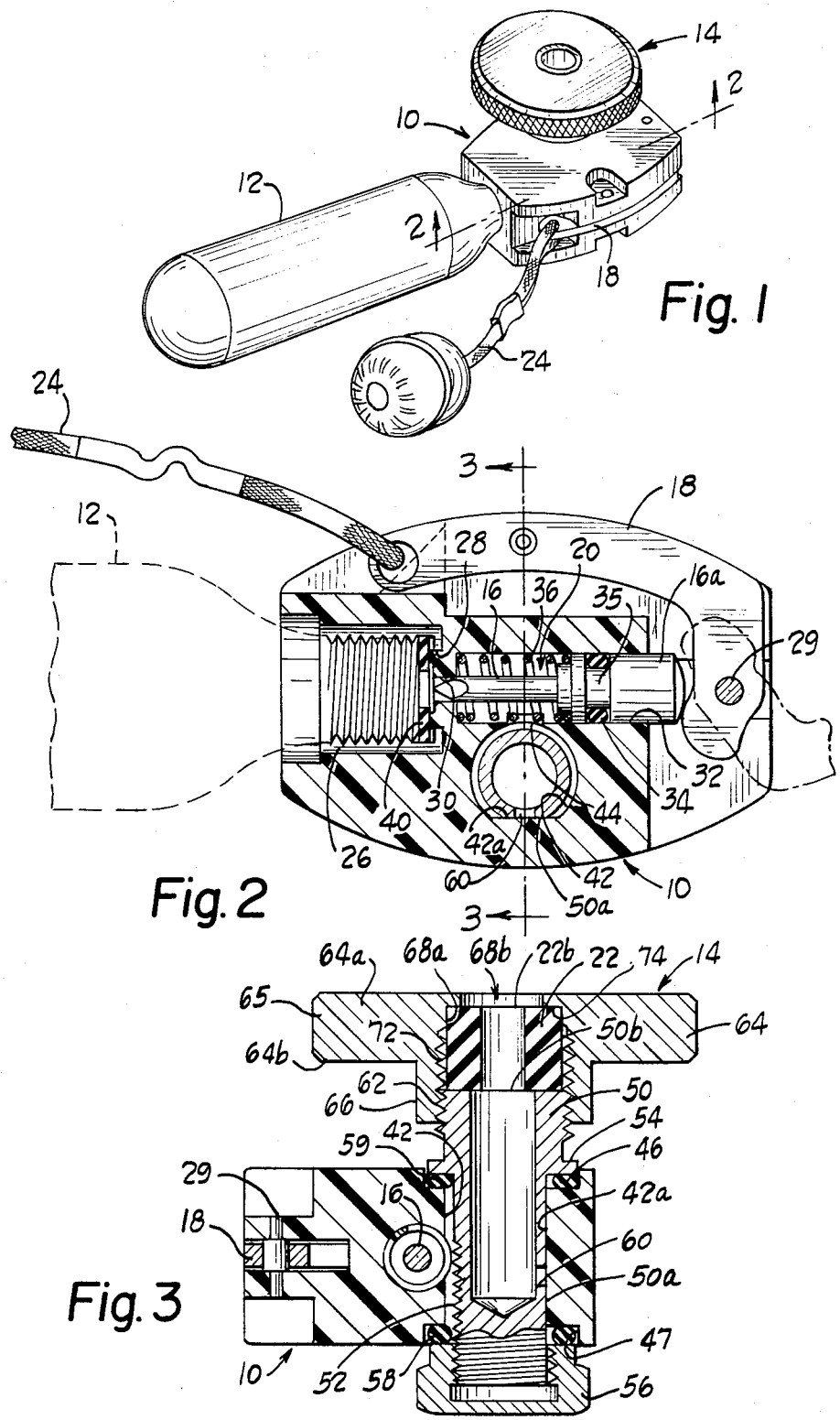

INSTANT TIRE INFLATOR

Description

Technical Field

The present invention relates to an inflator for pneumatic articles, such as tires.

Background Art

Various types of air pumps suitable for inflating tires, footballs and the like are known. One of the most common is a portable tubular-shaped pump with a hand operated piston. Typically, one end of the pump or a flexible hose fits onto a tire valve or inflating needle. The pump is manually worked until the tire, ball, or other object reaches the desired pressure. This type of pump is bulky, sometimes heavy, and requires considerable energy and time to fully inflate the object. This can be disadvantageous, particularly for bicyclists who carry the pump on their light weight bicycles and use tires inflated to 100 to 120 psig. Often during a bicycle race a cyclist punctures a tire and is required to replace the tire and inflate the spare with a minimum of time and energy. Also, motorcyclists, without spares, can repair tires but typically do not carry the relatively large tire pump required to inflate the tire.

A pressurized inflator is known that uses a pressurized sealed cartridge in a tubular container. One end of the container screws to a Schrader type valve stem of a tire. An impact to a threaded striker cap at the other end of the container causes the seal to be pierced. While this overcomes disadvantages of a piston-type pump, it is not suitable for Presta valves, must be threaded onto the tire valve and requires a housing for the cartridge, which adds carrying weight to the unit.

Disclosure of the Invention

The present invention provides an inflator assembly for inflating pneumatic tires as well as other inflatable objects that utilize similar valve stems or that utilize check valves and removable needles attachable through a stem portion to piston pumps, with compressed gas. In the preferred embodiment the assembly includes a housing having a passage that receives one end of a cartridge of compressed gas, a movable pin and an operating lever to pierce the cartridge, a conduit-forming member through which the gas flows, and a valve chuck for connecting the inflator to a tire valve stem. The conduit member includes a restrictive orifice for controlling the flow of gas into the tire being inflated. The valve chuck is threaded onto an external end of the conduit member and has an aperture and sealing gasket for receiving both threaded and unthreaded tire valve stems. The gasket, which is constructed of a resilient elastomeric material, preferably silicon rubber, is capable of being repeatedly compressed without permanent deformation and is soft enough to form a fluid-tight seal about a valve stem when the gasket is axially compressed by rotation of the chuck relative to the housing. The chuck is specially constructed with a large diameter knurled disc by which rotation is facilitated.

A bracket attached to the underside of a bicycle seat enables the inflator assembly to be conveniently transported with a minimum of extra weight. The bracket can be easily assembled and attached, and the inflator can be removed from the bracket without disassembly.

In operation, the chuck aperture is aligned with and placed over a tire valve stem. The chuck is manually rotated, compressing the gasket around the tire valve stem to form a seal and to retain the assembly connected to the stem. The cartridge is pierced by pulling outward on a lanyard attached to the operating lever, which causes the pin to pierce the cartridge, allowing compressed gas to rapidly inflate the tire. The ability to quickly and conveniently tighten and loosen the chuck seal for retention and removal by facilitating hand rotation of the chuck relative to the housing, when it is applied to and removed from a valve stem, is a significant feature and advantage of the invention.

The above and other features and advantages of the invention will become better understood from the detailed description that follows, when considered in connection with the accompanying drawings.

Brief Description of Drawings

FIG. 1 is a perspective view of the inflator of the present invention including a compressed gas cartridge.

FIG. 2 is a longitudinal sectional view along the line 2—2 of FIG. 1.

FIG. 3 is a transverse sectional view along the line 3—3 of FIG. 2.

Figure 4:
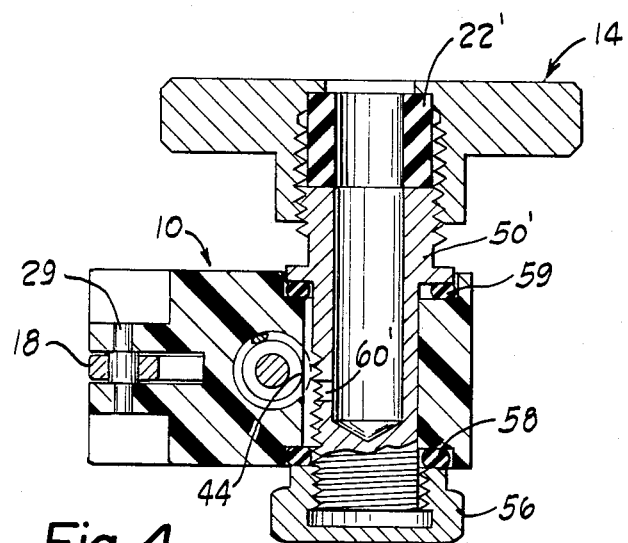
FIG. 4 is a similar view to FIG. 3 showing a modified embodiment.
Figure 6:
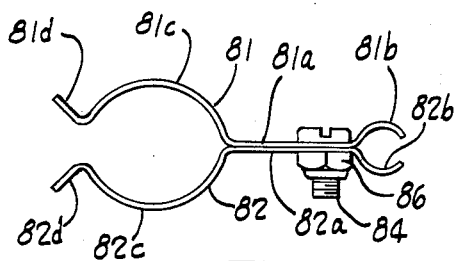
FIG. 6 is an elevational view of the clamp shown in FIG. 5.

Best Mode for Carrying Out the Invention

The inflator of the present invention comprises a housing 10 that receives a cartridge 12 of compressed gas, a valve chuck 14 that fits over and seals about a tire valve stem, a pin 16 for piercing the cartridge, a lever 18 for actuatin9 the pin, and a passage 20 communicating between the valve, chuck and cartridge. The chuck 14 contains a gasket 22 that forms a seal around the tire valve. Rotation of the chuck relative to the housing adjusts the seal. Once a seal is formed, the cartridge is pierced by pulling a lanyard 24 on the lever 18. Gas flows through the passage 20 into the tire. Once the gas is released, the tire is instantly inflated. The pressure achieved depends upon the size of the tire and the volume and pressure of the gas within the cartridge.

As best shown in FIG. 2, the housing 10 has an inset, internally threaded, cup 26 in one end, to receive a threaded end of a cartridge 12. The cup has a small central opening 28 through its inner end, through which the pin 16 can extend to pierce the cartridge. The opening 28 communicates with an aligned bore 30 and a larger coaxial bore 32, in which the pin 16 slides. The pin fits with clearance within the bore 30 and has an enlarged cylindrical head 16a that fits closely within the larger coaxial bore 32, closing the bore and maintaining the pin aligned for sliding reciprocable movement. An O-ring 34 in a circumferential groove 35 of the head provides a seal that prevents passage of gas past the head of the pin. A coil compression spring 36 fits within the larger coaxial bore 32, surrounds the pin, and acts against the head 16a to bias the pin away from the cartridge, against the lever 18. The spring has a sufficient inside diameter to provide a clearance between the spring and pin for the passage of gas from the cartridge.

The lever 18, which is pivoted on a cross-pin 29, acts against the head of the pin 16 when the lever is pulled outwardly from the housing by the lanyard and pushes the pin against the force of the compression spring, driving the point of the pin through the central opening 28 and into the end of the cartridge, piercing the cartridge. A rubber washer 40 within the cup 26 provides a seal between the cup and cartridge, so the gas released from the cartridge flows through the opening 28. As shown in phantom in FIG. 2, the lever 18 continues to pivot after driving the pin into the cartridge, to a position that provides clearance for the pin to move away from the cartridge sufficiently to partially clear the opening provided by the aligned bore 30.

The housing 10 has a transverse through-bore 42, directly adjacent the bore 32, that communicates therewith through an aperture 44 formed by a partial intersection between the two bores. Counterbores 46, 47 are provided at opposite faces of the housing for receiving seals. The bore 42 itself is smooth and is cylindrical, except for a longitudinal flat portion 42a diametrically opposite from the location of the aperture 44.

An externally threaded tubular member 50 fits into the transverse bore 42 of the housing. The tubular member has an external thread 52 along part of its length at one end. The member has a longitudinal flat portion 50a where the thread is absent and, hence, is "D" shaped up to a flange 54 to fit within the bore 42. This construction prevents relative rotation between the tubular member and the housing. The tubular member is closed at the threaded end and is longer than the thickness of the housing so it extends from opposite sides. A hexagonal nut or cap 56 is threaded onto the closed extending end of the tubular member to secure the tubular member within the bore. A seal is provided between the tubular member and the housing at the closed end by an O-ring 58 compressed by the nut. The nut also draws the flange 54 of the tubular member against an O-ring 59 at the opposite end of the transverse passage to prevent leakage. The O-rings are received in the counterbores 46, 47.

A restrictive orifice 60 is formed through the tubular member 50 in the unthreaded flat portion 50a of the embodiment of FIG. 1 to 3, which locate it 180° around the tubular member from the aperture 44. Gas from the aperture 44 flows around the tubular member 50 along the thread roots and also through a space between the interface between the flat 50a of the tubular member and the flat 42a of the transverse bore, which exists because of a clearance fit between the two. The somewhat tortuous flow path plus the size of the aperture 44 and the selected size of the restrictive orifice 60, which can be changed by substituting a different tubular member having a different orifice, creates a pressure drop during flow of gas. Thus, in operation, gas flows into the tubular member 50 through the orifice 60 at a desirably reduced pressure from that of the cartridge until the tire is fully inflated, at which time the pressures equalize.

An open end 50b of the tubular member 50 has an external thread 62 and receives a large diameter circular body 64 that in part forms the valve chuck 14. In the preferred embodiment, the diameter of the body is approximately 1⅜ inch to provide ease of hand rotation to apply and remove the chuck to a valve stem. The body 64 has a knurled periphery 65, two opposite flat faces 64a, 64b, and a central boss 66 extending from the face 64b. A central passage 68 extends through the nut. A large diameter part 68a of the passage is within the boss and has an internal thread 72 for mating with the external thread 62. A smaller diameter part 68b of the passage opens through the face 64a. It is of a slightly larger diameter than that of the valve stem to be accommodated. The larger diameter portion of the central passage 68 contains the annular gasket 22, which is constrained between the open end 50b of the tubular member 50 and a shoulder 74 formed between the larger and smaller diameter portions of the central passage 68.

The gasket 22 is a resilient, flexible, elastic material. Silicone rubber has been found to be particularly effective in providing good resilience and sealing characteristics. The outside diameter of the gasket fits closely within the threaded larger diameter portion 68a of the central passage 68. The gasket inside diameter is smaller than that of the passage 68b and just slightly larger than that of the valve stem to be accommodated. The axial length is somewhat shorter than the length of the central passage portion 68a. One axial end 22a rests against the end 50b of the tubular member 50 while the other end 22b rests against the shoulder 74. The circular inside edge of the annular gasket at the end 22b is rounded to facilitate insertion of a valve stem. By screwing the circular nut onto the threaded end of the tubular member 50, the gasket is compressed axially, diminishing the diameter of the central opening, to form a tight seal about a valve stem received within the passage 68b and the central opening of the gasket. In the embodiment shown in FIGS. 1 to 3, the central opening of the annular gasket 22 is of a size designed to receive and seal about an externally unthreaded portion of a Presta tire valve. It has been found that openings with an inside diameter of 0.235 inch, with the gasket uncompressed, are particularly suitable. Because the tires used with Presta type valves are typically of smaller volume than those used with a Schrader type valve, a larger pressure drop is desired in the flow of gas from the cartridge. Accordingly, the restrictive orifice 60 is of a desired small size. A diameter of 0.042 inch has been found to be particularly satisfactory.

A second embodiment of the invention is shown in FIG. 4, of a size to accommodate larger diameter Schrader valves used with larger capacity tires. Like parts are designated with the same reference numeral and parts varying slightly in construction are designated with the same reference numeral and a prime. A gasket 22' having a central opening of 0.295 inch is provided. In addition, a restrictive orifice 60' is provided in a tubular member 50', and located directly opposite the aperture 44, rather than being displaced 180° about the tubular member 50'. The restrictive orifice 60' is considerably larger than the orifice 60, a dimension of 0.082 inch diameter being particularly satisfactory. In all other respects, the embodiment of FIG. 4 is identical to that of FIGS. 1 to 3.

Figure 5:
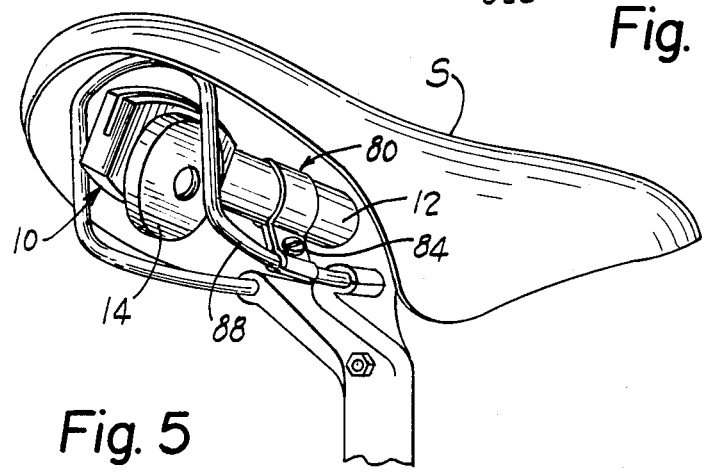
FIG. 5 is a perspective view of the inflator of FIG. 1 mounted on the underside of a bicycle seat by a clamp.

The inflator is conveniently secured beneath an unsprung seat or saddle S as shown in FIG. 5, by a bracket 80. Such a seat, which is typical of racing and touring seats, has two spaced wire or other brace members 88 that extend lengthwise beneath the support surface, resulting in ample storage space for the inflator. The bracket is formed of two pieces 81, 82 that are identical. Each has a central flat part 81a, 82a face to face with each other and each with an aligned hole through which a bolt 84 extends. A nut 86 cooperates with the bolt to clamp the two pieces 81, 82 together. Relatively small curved portions 81b, 82b adjacent the nut and bolt are of a size and spacing to clamp about a wire rod 88 of the saddle S. A substantially larger and greater diameter curved portion 81c, 82c of each piece are of a size and curvature to closely engage and hold the cartridge 12. End portions 81d, 82d of each clip flare outwardly adjacent the portions 81c, 82c. By loosening the nut and bolt, the curved portions 81b, 82b can be slipped over the wire rod 88 of the seat, and a cartridge 12 can be easily inserted into the curved portions 81c, 82c. The nut and bolt are then tightened to securely clamp the bracket to the wire rod, so it will not freely rotate. At the same time, the cartridge and attached housing 10 are securely clamped beneath the seat. Nevertheless, the cartridge can be pulled from the bracket in an axial direction of the cartridge by gripping the housing 10, when it is desired to use the inflator. Preferably, the lanyard 24 is also clamped between the two pieces 81, 82 to prevent inadvertent pivoting of the lever and puncturing of the cartridge.

In operation, the inflator assembly is removed from the mounting brackets. The chuck aperture is aligned with the valve stem of the tire being inflated. If necessary, the body 64 is rotated to relieve compression on the gasket and the chuck is placed over the end of the tire valve stem. The body is then manually rotated, causing the gasket to become compressed, forming a seal between the valve stem and the gasket. This tight seal holds the assembly firmly connected to the tire valve stem to prevent the released pressure from the cartridge from dislodging the inflator. The lanyard is then pulled, actuating the piercing pin 16 and instantly inflating the tire. As will be clear from FIG. 2, pulling the lanyard pivots the lever 18 to the phantom position, which drives the pin 16 by a camming action against the pin head, into the cartridge, with about 90° rotation of the lever. Further travel of the lever to the phantom position allows the pin to move out of engagement with the cartridge and to open the internal passage 20 so gas from the cartridge can flow through the valve chuck 14 into the valve of the tire being inflated. The gas is preferably carbon dioxide, which is liquefied in the cartridge until it is released, providing a large volume of gas at pressures of 90 to 120 pounds per square inch gauge, from a small cartridge volume.

Figure 7:
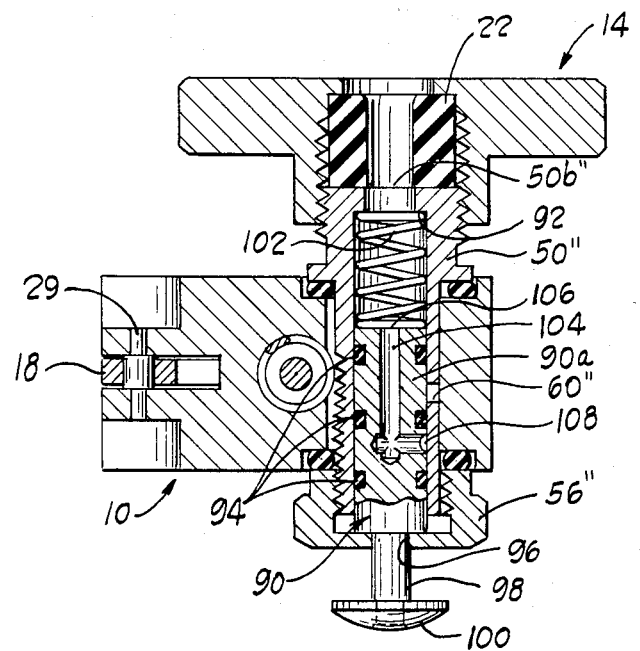
FIG. 7 is a view similar to FIG. 3 showing a modification that incorporates a control valve.

A modified embodiment of the assembly of FIG. 3 is shown in FIG. 7, in which like parts are designated with the same reference numerals and similar parts are designated with the same reference numeral and a double prime. The assembly is provided with a finger-operated slide valve 90 that prevents flow of gas from the cartridge through the valve chuck until the valve is operated. To accommodate the valve, a tubular member 50" is open at both ends and has a spring-retaining shoulder 92 adjacent the end 50b". A cylindrical body portion 90a fits closely within the tubular member and has suitably located O-ring seals 94. The body portion is retained by the nut 56", which has a central opening 96 through which a finger-operated stem 98 extends, with a button 100 attached. A compression coil spring 102 acts between the shoulder 92 and the opposite end of the plunger body portion 90a from the stem. A gas flow passage 104 extends through the body portion, communicating between a port 106 in the end of the plunger and with a peripheral groove 108, normally displaced axially from the orifice 60". Thus, the valve normally prevents flow from the pierced cartridge until the button or plunger are manually pressed to slide the groove 108 into alignment with the orifice. Release of finger pressure allows the spring 102 to move the valve and stop the flow. With this arrangement, several underinflated tires or other objects can be "topped off," i.e., fully inflated with a single cartridge, because the inflator can be removed from a valve stem without loss of pressure from the cartridge.

While preferred embodiments of the invention have been described in detail, it will be understood that various modifications or alterations may be made therein without departing from the spirit and scope of the invention set forth in the appended claims.

I claim:

1. An inflator comprising:
   (a) a housing including means to receive a cartridge of compressed gas, means to pierce said cartridge, and a passage for gas flow;
   (b) means forming a part of said passage and having a restrictive orifice to control the flow through the passage; and
   (c) a tubular support non-rotatably received within said housing and threaded at at least one end thereof, a chuck body rotatably carried on the threads of the tubular support stem, said body having an opening for receiving a valve stem and communicating with the interior of the tubular support, a peripheral surface on said body constructed to facilitate rotating the body on the threads of the tubular support, a cavity between the opening and the tubular support, and an annular elastomeric gasket positioned in the cavity to surround the stem received in the chuck body, said body having means thereon to compress the gasket axially between the body and the tubular support through rotation of the body relative to the housing to expand the gasket radially and form a seal around the stem.

2. An inflator as set forth in claim 1 wherein said tubular support is removably secured to said housing and said means having a restrictive orifice is a part of said tubular support.

3. An inflator comprising:
   (a) a housing having a first bore with a thread at one end for receiving and connecting a cartridge of compressed gas;
   (b) a lever-operated pin in said first bore movable within the bore to pierce said cartridge, said pin including means adjacent one end to close said first bore;
   (c) said first bore forming a passage for gas from the cartridge;
   (d) a second bore in the housing communicating with the first bore;
   (e) means removably received in said second bore and having an orifice that restricts flow from the first bore through the second bore; and
   (f) a chuck connected to the housing at an end of the second bore, said chuck having a rotatable body with a large diameter, a hand engageable portion to facilitate rotation of the body, a through passage of a diameter sufficient to receive an inflating stem at one end thereof, flange means thereon adjacent said one end of the through passage, and a thread at the other end of the through passage, and an elastomeric annular gasket disposed within the passage through and compressible axially and expandable radially when the chuck body is rotated on the threads relative to the housing.

4. An inflator comprising:

(a) a housing having a first bore with a thread at one end for receiving and connecting a cartridge of compressed gas;
(b) a lever-operated pin in said first bore movable within the bore to pierce said cartridge, said pin including means adjacent one end to close said first bore;
(c) said first bore forming a passage for gas from the cartridge;
(d) a second bore in the housing communicating with the first bore intermediate opposite ends thereof;
(e) a tubular member removably received in said second bore with a clearance fit, said member being closed at one end, open at the opposite end, and externally threaded at said opposite end, a transverse orifice in the member intermediate its ends, and means forming a seal between the tubular member and the housing adjacent opposite ends of the second bore and on opposite sides of the orifice, said orifice restricting flow from the first bore into the tubular member; and
(f) a valve chuck threadedly connected to the open end of the tubular member, said chuck having a disc-like body of relatively large diameter, a central boss of relatively small diameter extending from the disc-like body, a central passage through the disc-like body and boss, said central passage opening through the disc-like body with a first diameter portion large enough to receive a valve stem and having a second diameter portion within the boss larger than the first portion in both diameter and axial length, said second portion being internally threaded for attachment to said open end of the tubular member, and an elastomeric annular gasket within the second diameter portion of the central passage confined between the chuck body and the open end of the tubular member, said annular gasket having a central opening of smaller diameter than said first diameter portion of the central passage and an axial length less than that of the second diameter portion.

5. An inflator as set forth in claim 3 or 4 further including a cartridge connected to the housing, said cartridge having a generally cylindrical portion extending from the housing; and a clamp for securing the inflator to a bicycle seat of the type having a wire underframe, said clamp having two opposed members with flat portions in face-to-face contact and a threaded interconnection therebetween, opposed curved portions on opposite sides of the interconnection, the curved portions on one side being of a size to clamp about a wire of the seat underframe and the curved portions on the other side of the interconnection being of a size to clamp about the cylindrical portion of the cartridge.

6. An inflator as set forth in claim 1, 3, 4 or 2 including a finger-operable valve normally closed to prevent flow from said gas passage through said chuck and operable to selectively allow such flow.

* * * * *

UNITED STATES PATENT AND TRADEMARK OFFICE
CERTIFICATE OF CORRECTION

PATENT NO. : 4,489,855

DATED : December 25, 1984

INVENTOR(S) : Ronald L. Boetger

It is certified that error appears in the above—identified patent and that said Letters Patent is hereby corrected as shown below:

Column 2, line 39, "actuatin9" should be -- actuating --;
line 40, after "valve" delete the comma (,).

Column 6, line 23 (Claim 1), delete "stem."

Signed and Sealed this

Thirtieth Day of April 1985

[SEAL]

Attest:

DONALD J. QUIGG

Attesting Officer  Acting Commissioner of Patents and Trademarks